United States Patent
Chen et al.

(10) Patent No.: US 7,335,051 B2
(45) Date of Patent: Feb. 26, 2008

(54) BATTERY HOLDER

(75) Inventors: Hsiang-Ping Chen, Tu-Cheng (TW); Chih-Yuan Liao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 22 days.

(21) Appl. No.: 11/787,364

(22) Filed: Apr. 16, 2007

(65) Prior Publication Data
US 2007/0243755 A1    Oct. 18, 2007

(30) Foreign Application Priority Data
Apr. 17, 2006    (TW) ............................. 95206431 U

(51) Int. Cl.
*H01R 3/00* (2006.01)
(52) U.S. Cl. .................................................. 439/500
(58) Field of Classification Search ................ 439/500, 439/626, 341, 357, 330
See application file for complete search history.

(56) References Cited

U.S. PATENT DOCUMENTS

| | | | |
|---|---|---|---|
| 3,547,274 A * | 12/1970 | Sosinkski ................ | 211/89.01 |
| 3,609,640 A * | 9/1971 | Longenecker et al. ...... | 439/345 |
| 5,980,309 A * | 11/1999 | Frantz et al. ............... | 439/500 |
| 6,527,584 B2 * | 3/2003 | Ninomiya ................... | 439/500 |
| 6,669,504 B2 * | 12/2003 | Wu ............................ | 439/500 |
| 7,059,894 B1 * | 6/2006 | Huang ........................ | 439/500 |

\* cited by examiner

*Primary Examiner*—Neil Abrams
*Assistant Examiner*—Phuongchi Nguyen
(74) *Attorney, Agent, or Firm*—Wei Te Chung

(57) ABSTRACT

A battery holder (100) includes an insulative housing (1), a positive contact (3) and a negative contact (2). The housing defines a bottom wall (10) and a sidewall (11) extending from the bottom wall, which form a receiving room (12). The housing further defines a spring wall (14). The spring wall can elastically deform for positioning a battery or releasing a battery. A protecting wall (17) is defined around the spring wall, and a predetermined distance is formed between the protecting wall and the spring wall. While the spring wall is forced to deform, the protecting wall can stop the deforming process of the spring wall and thus can protect the spring wall from breakage.

10 Claims, 3 Drawing Sheets

BATTERY HOLDER

BACKGROUND OF THE INVENTION

1. Field of the Invention

The present invention relates to a battery holder for accommodating a battery therein.

2. Description of the Prior Art

As shown in FIG. 3, a conventional battery holder 80 generally includes an insulative housing 81, a negative contact 82 fixed in the housing 81 and a positive contact 83. The housing 81 defines a bottom wall 810 and a sidewall 811 extending from the bottom wall 810, which form a receiving room for holding a battery (not shown) therein. The sidewall 811 defines a cutout 8110. A spring wall 8111 extends from an edge of the bottom wall 810 and is located in the cut 8110. The spring wall 8111 includes a block 8112 on an upper portion thereof. The positive contact 83 defines a base 831 fixed in the sidewall 811, a tail 832 extending from a bottom end of the base 831, and a restrictor 833 extending from an upper end of the base 831. The restrictor 833 defines a part out of a plane in which the base 831 is located. The negative contact 82 includes a contacting pad 821 above the bottom wall 810 and a leg 822 through the bottom wall 810. The contacting pad 821 is elastic. The block 8112 cooperates with the restrictor 833 for positioning the battery in the housing 81.

During the installation of the battery, one end of the battery is firstly inserted below the restrictor 833, then the other end is pressed downwardly. While the battery is pressed, the springy sidewall 811 is forced to elastically deform outwardly. After that, the battery is received in the receiving room. If the battery is needed to be removed, a user can operate the spring wall 8111 outwardly to release the battery.

However, during the installing process or the removing process, the spring wall 8111 might be easily broken when the exterior force is too violent.

Inasmuch is the above-described disadvantage, a new battery holder is desired.

SUMMARY OF THE INVENTION

Accordingly, a major object of the present invention is to provide a battery holder having a sturdy housing.

To achieve the above object, a battery holder in accordance with a preferred embodiment of the present invention includes an insulative housing, a positive contact and a negative contact. The housing defines a bottom wall and a sidewall extending from the bottom wall, which form a receiving room. The housing further defines a spring wall. The spring wall can elastically deform for positioning a battery or releasing a battery. A protecting wall is defined around the spring wall, and a predetermined distance is formed between the protecting wall and the spring wall. While the spring wall is forced to deform, the protecting wall can stop the deformation of the spring wall and thus can protect the spring wall form being broken.

Other objects, advantages and novel features of the present invention will become more apparent from the following detailed description when taken in conjunction with the accompanying drawings, in which:

DETAILED DESCRIPTION OF THE PREFERRED EMBODIMENT OF THE INVENTION

Reference will now be made to the drawings to describe the present invention in detail.

Figure 1:
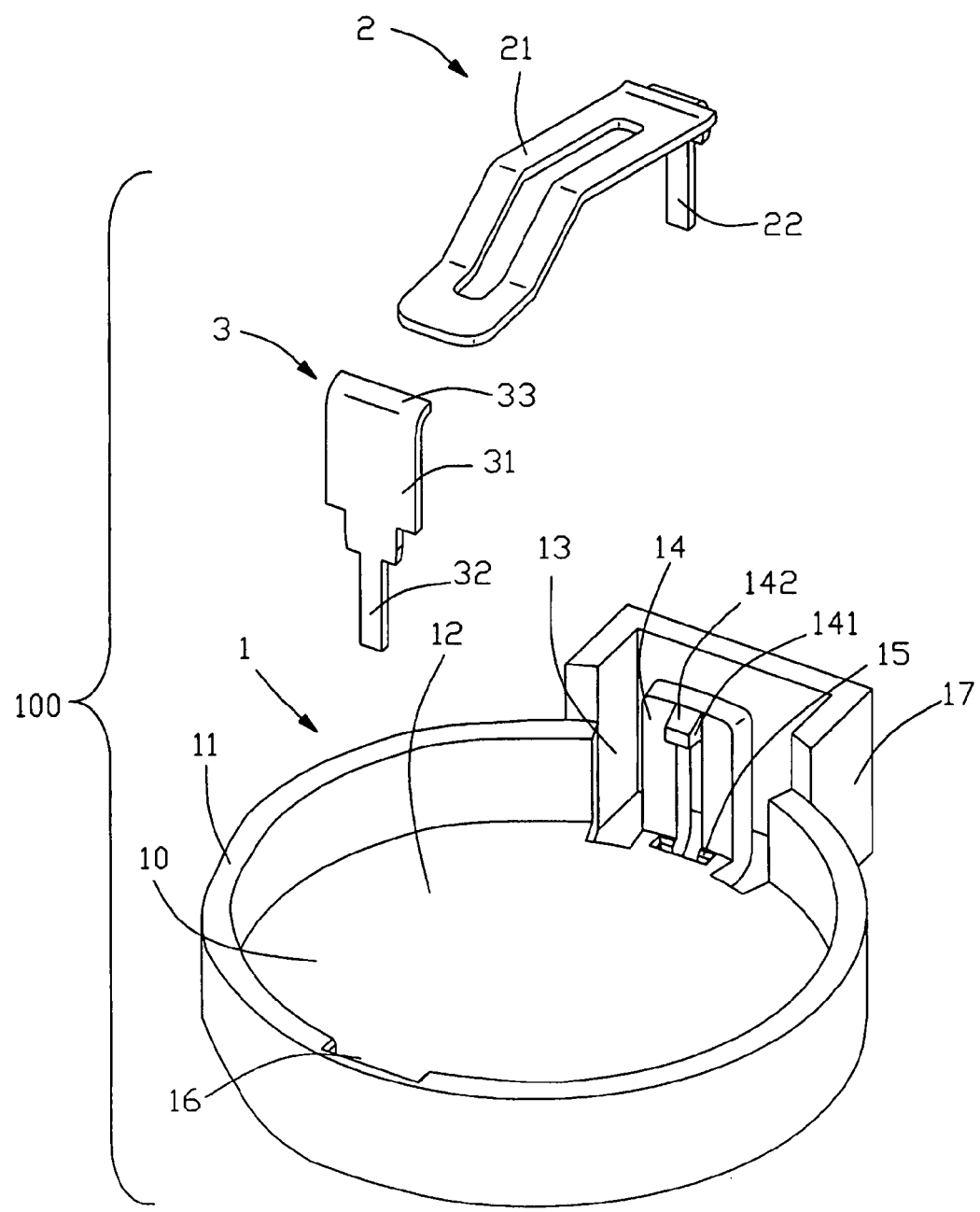
FIG. 1 is an exploded, isometric view of a battery holder in accordance with the preferred embodiment of the present invention.
Figure 2:
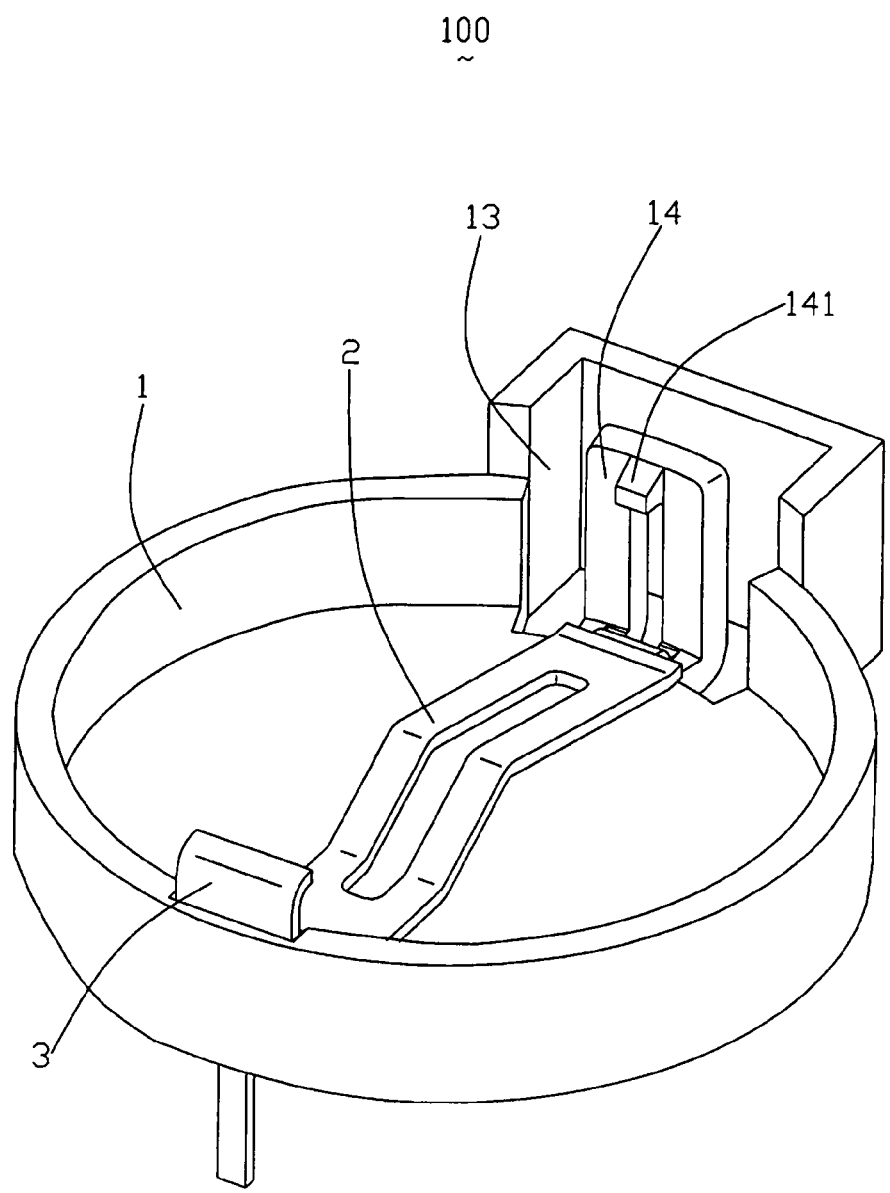
FIG. 2 is an assembled view of the battery holder of FIG. 1.
Figure 3:
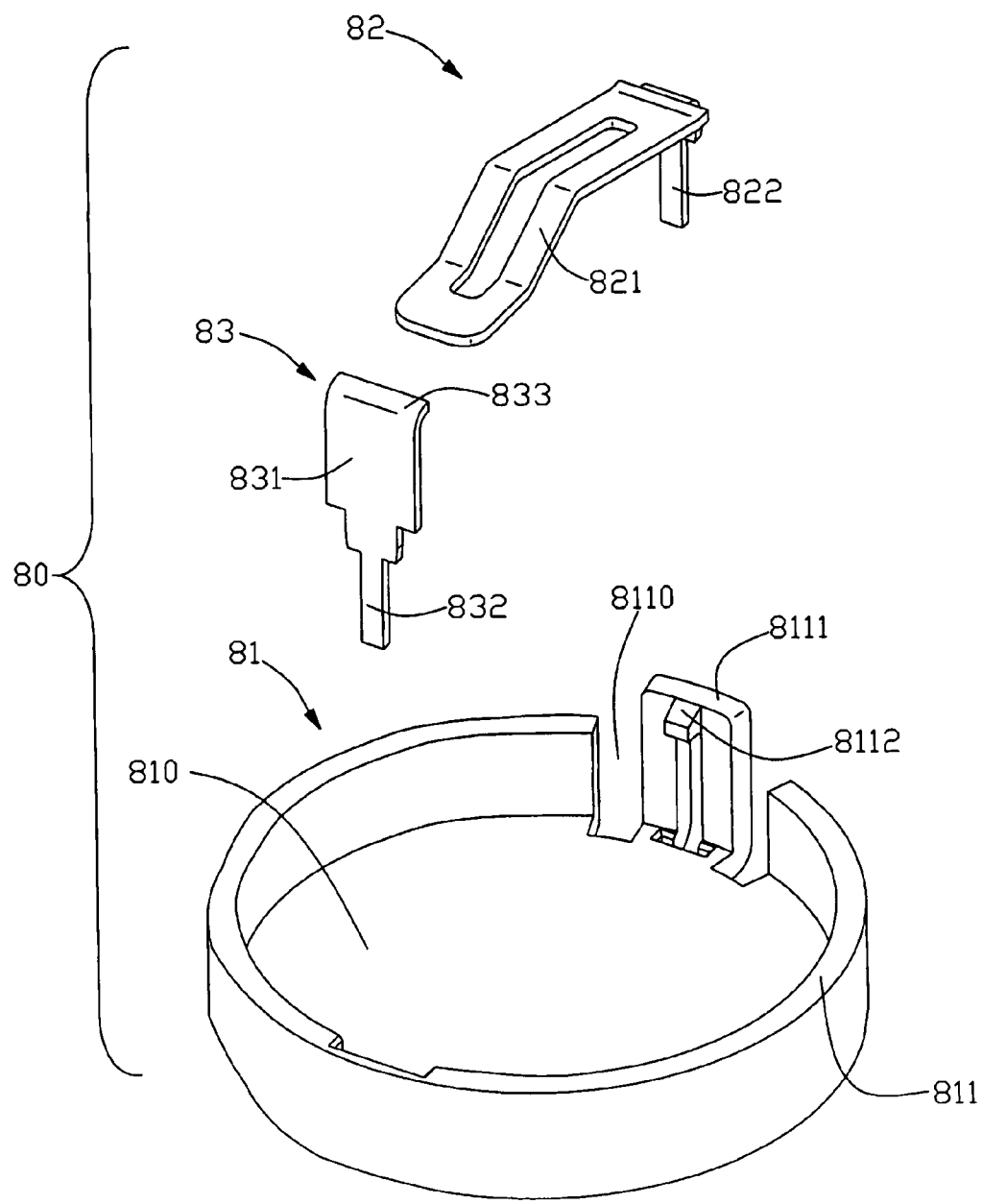
FIG. 3 is an exploded, isometric view of a conventional battery holder.

Referring to FIGS. 1-2, the present invention provides a battery holder 100 for accommodating a battery (not shown). The battery holder includes an insulative housing 1, a negative contact 2 and a positive contact 3.

The housing 1 includes a bottom wall 10 and a sidewall 11 extending from the bottom wall 10, which together form a receiving room 12 for receiving the battery. The sidewall 11 of the housing 1 defines a cut 13. A spring wall 14 extends from an edge of the bottom wall 10 and locates in the cut 13. A height of the spring wall 14 is greater than that of the sidewall 11. The insulative housing 1 further includes a protecting wall 17 around the spring wall 14. The protecting wall 17 can extend from one of the bottom wall 10 and the sidewall 11. In this embodiment, a height of the protecting wall 17 is substantially identical to that of the spring wall 14. A predetermined distance is formed between the spring wall 14 and the protecting wall 17 for providing the spring wall 14 with a space to deform. The spring wall 14 defines a block 141 protruding toward the center of the housing 1. The block 141 includes an upper bevel 142 for guiding the battery. The bottom wall 10 defines a through hole 15 at a boot of the spring wall 14. The sidewall 11 defines a passageway 16 opposite to the cut 13.

The negative contact 2 includes a contacting pad 21 and a leg 22 extending from the contacting pad 21, the leg 22 being fixed in the through hole 15. The contacting pad is arcuate and is elastic.

The positive contact 3 is generally rectangular and includes a base 31, a tail 32 extending from a lower portion of the base 31 and a restrictor 33 extending from an upper portion of the base 31. The tail 32 is fixed in the passageway 16, and the restrictor 33 has a part extending toward the spring wall 14.

When the battery is needed to be installed into the battery holder 100, one end of the battery is placed below the restrictor 33, and then the other end is pressed downwardly. During the pressing process, the bevel 142 of the block 141 defined on the spring wall 14 can guide the battery to enter the receiving room 12, which forces the spring wall 14 to deform outwardly until the battery is below the block 141. Thus, the battery is positioned in the receiving room 12 by virtue of the cooperation between the block 141 and the restrictor 33, i.e., the block 141 and the restrictor 33 can press on the battery. If a user wants to remove the battery from the receiving room 12, the user should force the spring wall 14 to deform outwardly for releasing the battery.

If the user presses the battery or operate the spring wall 14 forcibly, the spring wall 14 will be stopped by the protecting wall 17, which prevents the spring wall 14 from further deformation and protects the spring wall 14 from being broken.

It is noted that the restrictor can also be defined on the insulative housing.

From the foregoing it will be recognized that the principles of the invention may be employed in various arrangements to obtain the features, advantages and benefits described above. It is to be understood, therefore, that even though numerous characteristics and advantages of the invention have been set forth together with details of the structure and function of the invention, this disclosure is to be considered as illustrative only. Various changes and modifications may be made in detail, especially in matters of size, shape and arrangements of parts, without departing from the spirit and scope of the invention as defined by the appended claims.

What is claimed is:

1. A battery holder, for accommodating a battery therein, comprising:
   an insulative housing including a bottom wall, a circumferential sidewall extending from the bottom wall, and a spring wall extending from the bottom wall, the spring wall defining a block on at upper portion of the spring wall thereof;
   a negative contact located at the spring wall;
   a positive contact located opposite to the negative contact;
   wherein the sidewall of the housing defines a cutout, and the spring wall is located in the cutout and spaced from the circumferential side wall;
   wherein the insulative housing defines a protecting wall around outer side of the spring wall away from the bottom wall in suspension manner, and a predetermined distance is formed between the protective wall and the spring wall.

2. The battery holder as described in claim 1, wherein the block defines an upper bevel.

3. The battery holder as described in claim 1, wherein the positive contact includes a base, a tail extending from the base and a restrictor extending from the base opposite to the tail.

4. The battery holder as described in claim 1, wherein the sidewall of the housing further defines a restrictor for pressing on the battery.

5. The battery holder as described in claim 1, wherein a height of the spring wall is substantially equal to that of the protecting wall.

6. The battery holder as described in claim 5, wherein a height of the sidewall is smaller than those of the spring wall and the protecting wall.

7. A battery holder, for accommodating a battery therein, comprising:
   an insulative housing including a bottom wall, a circumferential sidewall extending from the bottom wall and defining a cutout, and a spring wall extending from the bottom wall and essentially located in said cutout and spaced from the circumferential side wall, a locking block located around an upper portion of the spring wall;
   a positive contact;
   a negative contact; wherein
   the insulative housing defines a protecting wall distantly located at an outer side of the spring wall away from the bottom wall, and only linked to the circumferential wall in a suspension manner.

8. The battery holder as claimed in claim 7, wherein the bottom wall does not extend between the spring wall and the protecting wall.

9. The battery holder as claimed in claim 7, wherein the spring wall is higher than the circumferential side wall.

10. The battery holder as claimed in claim 9, wherein the protecting wall is higher than the circumferential side wall.

\* \* \* \* \*